(12) United States Patent
Liao et al.

(10) Patent No.: US 12,276,191 B2
(45) Date of Patent: Apr. 15, 2025

(54) ELECTROMAGNETIC REVERSAL DOWNHOLE PRESSURE INTENSIFIER

(71) Applicants: CHINA UNIVERSITY OF PETROLEUM (EAST CHINA), Qingdao (CN); Qingdao Zhongshi Intelligent Drilling Techology Co. LTD, Qingdao (CN)

(72) Inventors: Hualin Liao, Qingdao (CN); Yuhang He, Qingdao (CN); Wenlong Niu, Qingdao (CN); Jilei Niu, Qingdao (CN); Huajian Wang, Qingdao (CN); Yuntao Liao, Qingdao (CN); Yucai Shi, Qingdao (CN); Jinkai Chen, Qingdao (CN)

(73) Assignees: CHINA UNIVERSITY OF PETROLEUM (EAST CHINA), Qingdao (CN); Qingdao Zhongshi Intelligent Drilling Techology Co. LTD, Qingdao (CN)

( * ) Notice: Subject to any disclaimer, the term of this patent is extended or adjusted under 35 U.S.C. 154(b) by 0 days.

(21) Appl. No.: 18/741,708

(22) Filed: Jun. 12, 2024

(65) Prior Publication Data
US 2025/0043635 A1 Feb. 6, 2025

(51) Int. Cl.
*E21B 7/18* (2006.01)
*E21B 21/10* (2006.01)
*E21B 23/10* (2006.01)

(52) U.S. Cl.
CPC .............. *E21B 7/18* (2013.01); *E21B 21/10* (2013.01); *E21B 23/10* (2013.01)

(58) Field of Classification Search
CPC ............. E21B 7/18; E21B 7/185; E21B 21/10
See application file for complete search history.

(56) References Cited

U.S. PATENT DOCUMENTS

| 4,458,766 A | * | 7/1984 | Siegel | E21B 7/18 175/25 |
| 6,073,708 A | * | 6/2000 | Brown | E21B 4/00 175/93 |

(Continued)

FOREIGN PATENT DOCUMENTS

| CN | 201318125 Y | 9/2009 |
| CN | 201705197 U | 1/2011 |

(Continued)

*Primary Examiner* — George S Gray

(57) ABSTRACT

An electromagnetic reversal downhole pressure intensifier is provided, including a pressure intensifier and a drill bit. A nozzle and a bit water way are arranged on the drill bit, the pressure intensifier includes an electromagnetic valve seat, a pressurizing chamber, and a discharge flow pup joint; an electromagnetic valve is arranged in the electromagnetic valve seat, and an electromagnetic valve seat flow channel is arranged on the electromagnetic valve seat; a plunger is arranged in the pressurizing chamber, and the upper end of the plunger separates the inner chamber of the pressurizing chamber into a non-rod chamber and a rod chamber; a conveying pipe is arranged in the discharge flow pup joint, and a flow channel is formed between the conveying pipe and the discharge flow pup joint; the drill bit is connected to the discharge flow pup joint.

7 Claims, 10 Drawing Sheets

(56) References Cited

U.S. PATENT DOCUMENTS

| | | | | |
|---|---|---|---|---|
| 6,289,998 | B1* | 9/2001 | Krueger | E21B 7/18 175/25 |
| 2021/0277721 | A1* | 9/2021 | Portwood | E21B 10/60 |

FOREIGN PATENT DOCUMENTS

| | | |
|---|---|---|
| CN | 109113567 A | 1/2019 |
| CN | 115095309 A | 9/2022 |
| CN | 115898291 A | 4/2023 |
| SU | 857491 A1 | 8/1981 |

* cited by examiner

ELECTROMAGNETIC REVERSAL DOWNHOLE PRESSURE INTENSIFIER

CROSS-REFERENCE TO RELATED APPLICATIONS

This application claims priority to Chinese Application No. 202310960526.3, filed on Aug. 2, 2023, entitled "ELECTROMAGNETIC REVERSAL DOWNHOLE PRESSURE INTENSIFIER". These contents are hereby incorporated by reference.

TECHNICAL FIELD

The present disclosure relates to the technical field of oil drilling equipment, in particular to an electromagnetic reversal downhole pressure intensifier.

BACKGROUND

For deep wells and ultra-deep wells, with the increase of well depth, the confining pressure on the rock increases linearly with the increase of well depth, the plastic strength of the rock increases, and the resistance ability to destruction is enhanced; the hydrostatic column pressure increases, the force acting on the rock increases, and the strength of the rock at the bottom of the well rises; the stress concentration range around the wellbore expands, and the radial effective stress on the rock increases, leading to the increase of the plastic strength of the rock, thereby causing the low speed of mechanical drilling in the drilling process of deep wells and ultra-deep wells, and serious wears of the drill bit.

To solve the problems of low mechanical drilling speed and drill bit wear caused by the increase in rock strength, the water jet assisted rock breaking method is widely used due to its strong operability and high rock breaking efficiency. The water jet assisted rock breaking method refers to a drilling technique that uses a downhole pressure intensifier installed above the drill bit to pressurize a portion of the drilling fluid circulating in the drill string to form a high-pressure jet, then spraying out through the drill bit nozzle to impact the bottom of the well to directly or indirectly assist the drill bit in breaking the rock, which is tightly combines hydraulic rock breaking with mechanical rock breaking to achieve the goal of improving drilling speed. In addition, due to the drill bit nozzle being arranged on the drill bit with a certain eccentric distance, the nozzle will rotate around the axis of the drill bit during the rotary drilling process. The high-pressure jet not only assists in breaking the rock, but also cuts circular grooves at the bottom of the well, thereby cutting off the horizontal crustal stress, reducing the stress at the bottom of the well, lowering the rock strength in the interaction area between machines and rocks, and thereby improving the mechanical rock breaking speed and reducing the wear of the drill bit.

Based on this, the disclosure provides an electromagnetic reversal downhole pressure intensifier that can achieve the above-mentioned downhole pressure intensifier function to form a water jet for auxiliary rock breaking. During operation, it directly uses drilling fluid energy to drive, and uses the liquid pressure difference force on both sides of the upper end of the plunger to pressurize. The pressure boosting process does not consume hydraulic energy, and the drilling fluid jet from the bottom hole is used to achieve bottom hole cutting and rock breaking.

SUMMARY

To overcome the deficiency of the existing technologies mentioned above, the present disclosure provides an electromagnetic reversal downhole pressure intensifier, which adopts the following technical solution:

An electromagnetic reversal downhole pressure intensifier, including a pressure intensifier and a drill bit, a nozzle and a bit water way are arranged on the drill bit, and the nozzle is in communication with an inner chamber of the drill bit;

the pressure intensifier includes an electromagnetic valve seat, a pressurizing chamber, and a discharge flow pup joint fixedly connected in sequence along an axial direction;

an electromagnetic valve is arranged in the electromagnetic valve seat, and the electromagnetic valve is a two-position three-way electromagnetic valve; the electromagnetic valve seat is provided with a through electromagnetic valve seat flow channel, the electromagnetic valve seat flow channel is connected to a port P of the electromagnetic valve, a port A of the electromagnetic valve is connected to a pressurizing chamber inlet flow channel arranged in the electromagnetic valve seat, a port T of the electromagnetic valve is in communication with an annular space between a drill rod and a casing pipe;

a plunger is coaxially arranged in the pressurizing chamber, an upper end of the plunger is in sealed slide fitting with an inner wall of the pressurizing chamber, the plunger is in sealed slide fitting with a lower end of the pressurizing chamber; the upper end of the plunger separates the inner chamber of the pressurizing chamber into a non-rod chamber and a rod chamber; a first flow channel of the pressurizing chamber and a second flow channel of the pressurizing chamber are arranged on a cylinder wall of the pressurizing chamber; an one-way valve is arranged between the first flow channel of the pressurizing chamber and the rod chamber, a flow direction of the one-way valve is from the first flow channel of the pressurizing chamber to the rod chamber; the rod chamber is in communication with the second flow channel of the pressurizing chamber;

a conveying pipe is arranged inside the discharge flow pup joint, a flow channel is formed between an outer wall of the conveying pipe and an inner wall of the discharge flow pup joint;

the drill bit is connected to the discharge flow pup joint;

the electromagnetic valve seat flow channel, the first flow channel of the pressurizing chamber, the flow channel, and the bit water way are sequentially in communication with each other;

the pressurizing chamber inlet flow channel is in communication with the non-rod chamber, the second flow channel of the pressurizing chamber, the conveying pipe, and the inner chamber of the drill bit are sequentially connected to each other; a high pressure valve is arranged between the second flow channel of the pressurizing chamber and the conveying pipe.

Preferably, the electromagnetic valve seat includes an electromagnetic valve upper seat and an electromagnetic valve lower seat which are fixed connected;

the electromagnetic valve seat flow channel passes through the electromagnetic valve upper seat and the electromagnetic valve lower seat.

Preferably, the pressurizing chamber includes an upper plunger cylinder and a lower plunger cylinder which are fixed connected, and the upper plunger cylinder is fixedly connected to the electromagnetic valve lower seat;

the first flow channel of the pressurizing chamber passes through the upper plunger cylinder and the lower plunger cylinder;

the upper end of the plunger is in sealed slide fitting with an inner wall surface of the upper plunger cylinder, the plunger is in sealed slide fitting with an inner wall surface of the lower plunger cylinder;

the second flow channel of the pressurizing chamber is arranged on the lower plunger cylinder.

Preferably, the high pressure valve includes a valve body coaxially arranged at a lower end of the lower plunger cylinder, the valve body is provided with a valve body channel in communication with the conveying pipe;

an inner upper part of the valve body is fixedly provided with a sealing head, an inner lower part of the valve body is slidably fitted with a conical valve core; a lower part of the conical valve core is sleeved with a reset spring, and a lower end of the reset spring is pressed against the support step on an inner side of the valve body;

a bottom of the sealing head is a conical structure with a narrow top and a wide bottom, a bottom conical surface of the sealing head and an upper conical surface of the conical valve core form a conical sealing structure under an action of the reset spring;

an inner cavity of the sealing head is in communication with the second flow channel of the pressurizing chamber; and after the conical valve core is moved downwards, the inner cavity of the sealing head is in communication with the valve body channel.

Preferably, a limit sleeve is arranged between the lower plunger cylinder and the discharge flow pup joint;

a middle part of the limit sleeve is provided with a limit through hole for the conveying pipe to pass through;

a connecting sleeve is arranged at an outlet of the high pressure valve, and the connecting sleeve is connected to the conveying pipe;

an inner upper part of the discharge flow pup joint is provided with a conveying pipe pup joint, a middle part of the conveying pipe pup joint is provided with a pup joint through hole for the conveying pipe to pass through; and the first flow channel of the pressurizing chamber, the limit through hole, the pup joint through hole, and the flow channel are in communication with each other.

Preferably, an upper discharge flow sleeve and a lower discharge flow sleeve provided with circular structures are sequentially arranged in the flow channel from top to bottom;

inner walls of the upper discharge flow sleeve and the lower discharge flow sleeve are fixedly connected to the outer wall of the conveying pipe, the outer walls of the upper discharge flow sleeve and the lower discharge flow sleeve are fixedly connected to the inner wall of the discharge flow pup joint;

the upper discharge flow sleeve and the lower discharge flow sleeve are provided with discharge passages in communication with the flow channel; and the conveying pipe between the upper discharge flow sleeve and the lower discharge flow sleeve is provided with a damping spring.

Preferably, a lower end of the conveying pipe is connected to a high pressure pipe through a high pressure pipe joint; and the high pressure pipe is in communication with the inner chamber of the drill bit.

Preferably, an upper joint is fixedly arranged on an upper part of the electromagnetic valve upper seat, a battery assembly for supplying power to the electromagnetic valve is fixedly arranged in an inner through hole of the upper joint;

the battery assembly includes a plurality of batteries and a battery pack bracket fixed in the inner through hole of the upper joint;

an interior of the battery pack bracket is provided with a bracket flow channel that is in communication with the electromagnetic valve seat flow channel; and a plurality of assembled grooves are uniformly arranged along a circumferential direction on an outer wall of the battery pack bracket, and the batteries are assembled in the corresponding assembled grooves.

Preferably, arc-shaped battery pressing plates are provided on the outer wall of the battery pack bracket to fix the batteries in the assembled grooves; and the arc-shaped battery pressing plates are connected to the battery pack bracket through bolts.

Preferably, a diversion joint is provided between the upper joint and the electromagnetic valve upper seat;

a diversion head is arranged at a bottom end of the battery pack bracket, an inner upper part of the diversion head is provided with a main flow channel in communication with the bracket flow channel, an inner lower part of the diversion head is provided with a plurality of diversion channels in communication with the main flow channel;

an inner bottom end of the diversion joint is supported at a bottom end of the diversion head, a joint flow channel in communication with the diversion channels are provided on the diversion joint; and the joint flow channel is in communication with the electromagnetic valve seat flow channel.

The advantageous effects of the present disclosure are shown as below:

1. The electromagnetic reversal downhole pressure intensifier of the present disclosure is directly driven by drilling fluid energy during operation, and uses the liquid pressure difference force on both sides of the upper end of the plunger to pressurize. The pressure boosting process does not consume hydraulic energy, and the drilling fluid jet from the bottom hole is used to achieve bottom hole cutting and rock breaking 2. The overall device of the present disclosure has a simple structure and easy to implement functions. When the electromagnetic reversal downhole pressure intensifier wears out or reaches its service life, it does not need to be pulled out and can continue to work as a drill string without affecting the circulation of the overall drilling fluid.

3. In the electromagnetic reversal downhole pressure intensifier of the present disclosure, the pressure output characteristic can be controlled through a controller to switch the frequency of the electromagnetic valve, thereby achieving modulation of the output characteristic waveform.

Figure 1:
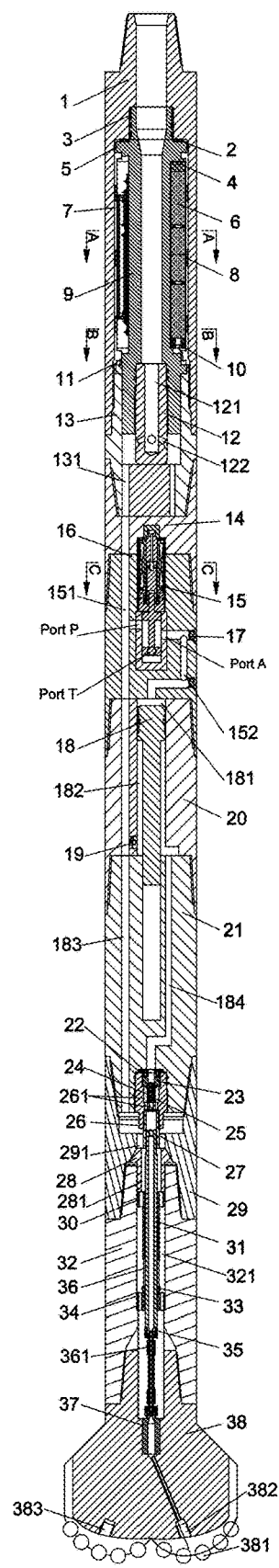
FIG. 1 is a schematic diagram of the structure of the electromagnetic reversal downhole pressure intensifier of the present disclosure.

Reference numbers in the drawings: 1—upper joint, 2—gap washer, 3—sealing ring, 4—battery protection baffle, 5—centralizer, 6—battery, 7—controller, 8—arc-shaped battery pressing plate, 9—battery pack bracket, 91—bracket flow channel, 92—assembled groove, 10—socket, 11—plug, 12—diversion head, 121—main flow channel, 122—diversion channel, 13—diversion joint, 131—joint flow channel, 14—electromagnetic valve upper seat, 15—electromagnetic valve, 151—electromagnetic valve seat flow channel, 152—pressurizing chamber inlet flow channel, 16—electromagnetic valve lower seat, 17—seal plug, 18—plunger, 181—non-rod chamber, 182—rod chamber, 183—first flow channel of the pressurizing chamber, 184—second flow channel of the pressurizing chamber, 19—one-way valve, 20—upper plunger cylinder, 21—lower plunger cylinder, 22—valve cover, 23—sealing head, 24—conical valve core, 25—reset spring, 26—valve body, 261—valve body passage, 27—connecting sleeve, 28—conveying pipe pup joint, 281—pup joint through hole, 29—limit sleeve, 291—limit through hole, 30—upper discharge flow sleeve, 31—damping spring, 32—discharge flow pup joint, 321—flow channel, 33—spring limit sleeve, 34—lower discharge flow sleeve, 35—high pressure pipe joint, 36—conveying pipe, 361—high pressure pipe, 37—the inner chamber of drill bit, 38—drill bit; 381—teeth; 382—nozzle; 383—bit water way.

DETAILED DESCRIPTION OF THE EMBODIMENTS

In order to make the technical problems, technical solutions and beneficial effects of the present invention clearer, the present invention will be further described in detail below with reference to the accompanying drawings and embodiments.

It should be understood that these embodiments are only used to illustrate the present invention, but the present invention is not limited thereto. In addition, it should be understood that after reading the content described in the present invention, those skilled in the art can make various changes or modifications to the present invention, and these equivalent technical means also fall within the scope of protection of the present invention.

In the present invention, the terms "first," "second," and "third" are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

Embodiment 1

As shown in FIG. 1, an electromagnetic reversal downhole pressure intensifier is provided, which includes a pressure intensifier and a drill bit 38, a nozzle 382 and a bit water way 383 are arranged on the drill bit 38, and the nozzle 382 is in communication with the inner chamber of the drill bit 37. PDC teeth 381 are arranged on the outer side of the drill bit.

The pressure intensifier includes an electromagnetic valve seat, a pressurizing chamber, and a discharge flow pup joint 32 fixedly connected in sequence along an axial direction.

Figure 4:
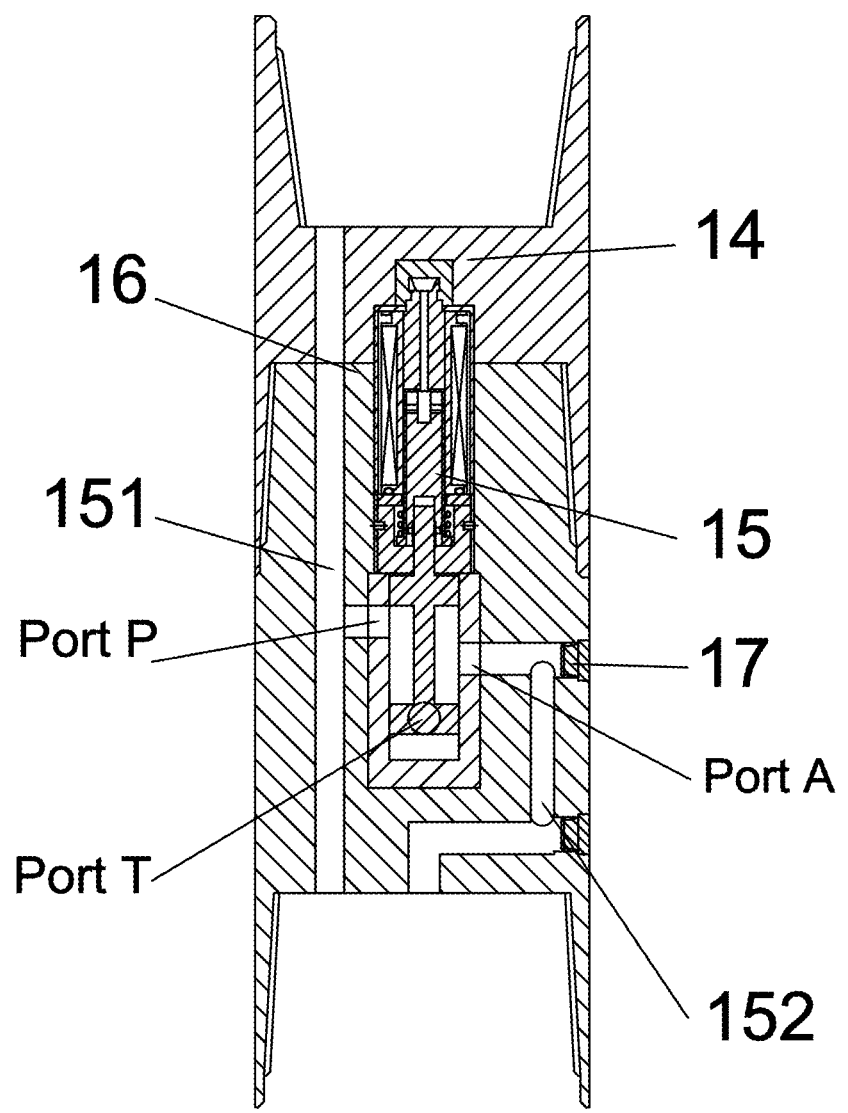
FIG. 4 is a schematic diagram of the structure of the electromagnetic valve in the present disclosure.

As shown in FIG. 4, an electromagnetic valve 15 is arranged in the electromagnetic valve seat, and the electromagnetic valve 15 is a two-position three-way electromagnetic valve. Since the fact that electromagnetic valve 15 can be achieved using existing technology, its specific structure will not be elaborated here. The electromagnetic valve seat is provided with a through electromagnetic valve seat flow channel 151, the electromagnetic valve seat flow channel 151 is connected to a port P of the electromagnetic valve 15, a port A of the electromagnetic valve 15 is connected to a pressurizing chamber inlet flow channel 152 arranged in the electromagnetic valve seat, a port T of the electromagnetic valve 15 is in communication with an annular space between a drill rod and a casing pipe. Specifically, a seal plug 17 is provided at the position where the pressurizing chamber inlet flow channel 152 passes through the electromagnetic valve body.

Figure 5:
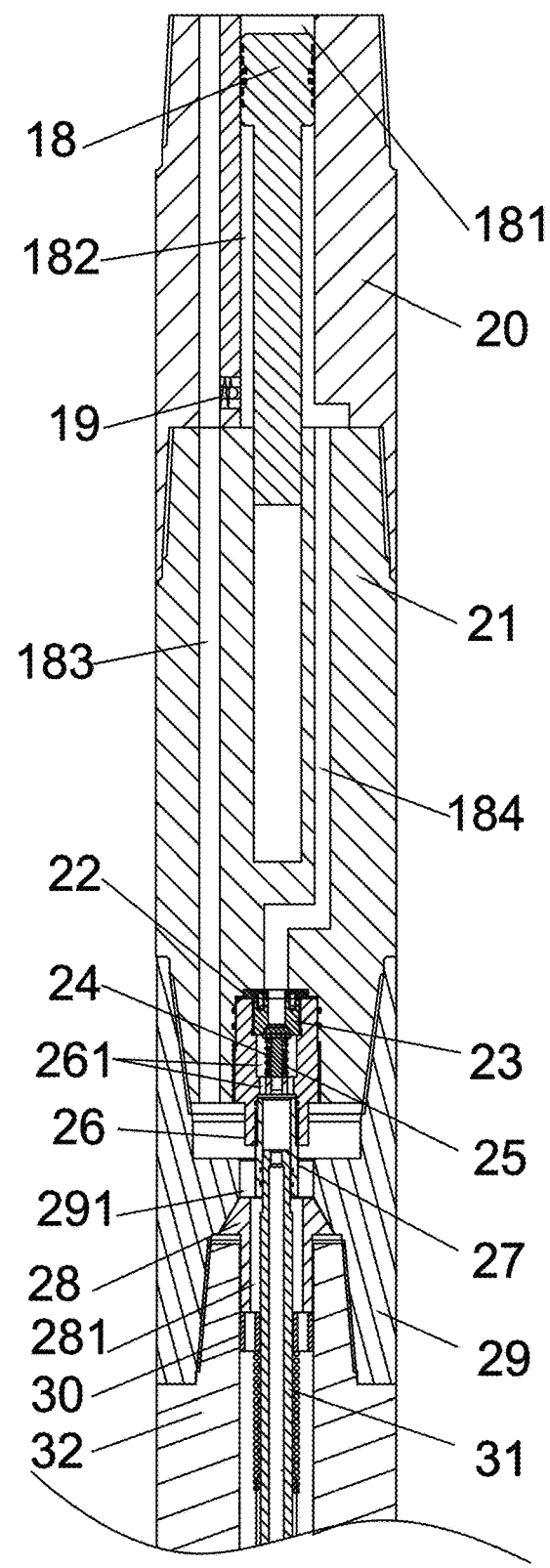
FIG. 5 is a schematic diagram of the structure of the pressurizing chamber in the present disclosure.

As shown in FIG. 5, a plunger 18 is coaxially arranged in the pressurizing chamber, an upper end of the plunger 18 is in sealed slide fitting with an inner wall of the pressurizing chamber, and the plunger 18 is in sealed slide fitting with a lower end of the pressurizing chamber. The upper end of the plunger 18 separates the inner chamber of the pressurizing chamber into a non-rod chamber 181 and a rod chamber 182. A first flow channel 183 of the pressurizing chamber and a second flow channel 184 of the pressurizing chamber are arranged on a cylinder wall of the pressurizing chamber. An one-way valve 19 is arranged between the first flow channel 183 of the pressurizing chamber and the rod chamber 182, and the flow direction of the one-way valve 19 is from the first flow channel 183 of the pressurizing chamber to the rod chamber 182. The rod chamber 182 is in communication with the second flow channel 184 of the pressurizing chamber.

A conveying pipe 36 is arranged inside the discharge flow pup joint 32, a flow channel 321 is formed between an outer wall of the conveying pipe 36 and an inner wall of the discharge flow pup joint 36.

The drill bit 38 is connected to the discharge flow pup joint 32.

The electromagnetic valve seat flow channel 151, the first flow channel 183 of the pressurizing chamber, the flow channel 321, and the bit water way are sequentially in communication with each other. The pressurizing chamber inlet flow channel 152 is in communication with the non-rod chamber 181, the second flow channel 184 of the pressurizing chamber, the conveying pipe 36, and the inner chamber 37 of the drill bit are sequentially connected to each other. A high pressure valve is arranged between the second flow channel 184 of the pressurizing chamber and the conveying pipe 36.

Preferably, as shown in FIG. 4, the electromagnetic valve seat includes an electromagnetic valve upper seat 14 and an electromagnetic valve lower seat 16 which are fixed connected. Specifically, the lower part of the inner wall surface of the electromagnetic valve upper seat is threaded connected to the upper part of the outer wall surface of the electromagnetic valve lower seat.

The electromagnetic valve seat flow channel 151 passes through the electromagnetic valve upper seat 14 and the electromagnetic valve lower seat 16.

Preferably, as shown in FIG. 5, the pressurizing chamber includes an upper plunger cylinder 20 and a lower plunger cylinder 21 which are fixed connected, and the upper plunger cylinder 20 is fixedly connected to the electromagnetic valve lower seat 16.

Specifically, the upper part of the outer wall of the upper plunger cylinder 20 is threaded to the lower part of the inner wall of the electromagnetic valve lower seat 16, and the upper part of the outer wall of the lower plunger cylinder 21 is threaded to the lower part of the inner wall of the upper plunger cylinder 20.

The first flow channel 183 of the pressurizing chamber passes through the upper plunger cylinder 20 and the lower plunger cylinder 21.

The upper end of the plunger 18 is in sealed slide fitting with an inner wall surface of the upper plunger cylinder 20, the plunger 18 is in sealed slide fitting with an inner wall surface of the lower plunger cylinder 21.

The second flow channel 184 of the pressurizing chamber is arranged on the lower plunger cylinder 21. Specifically, the central axis of the lower end of the second flow channel 184 of the pressurizing chamber is in sealed slide fitting with the central axis of the plunger 18.

Figure 6:
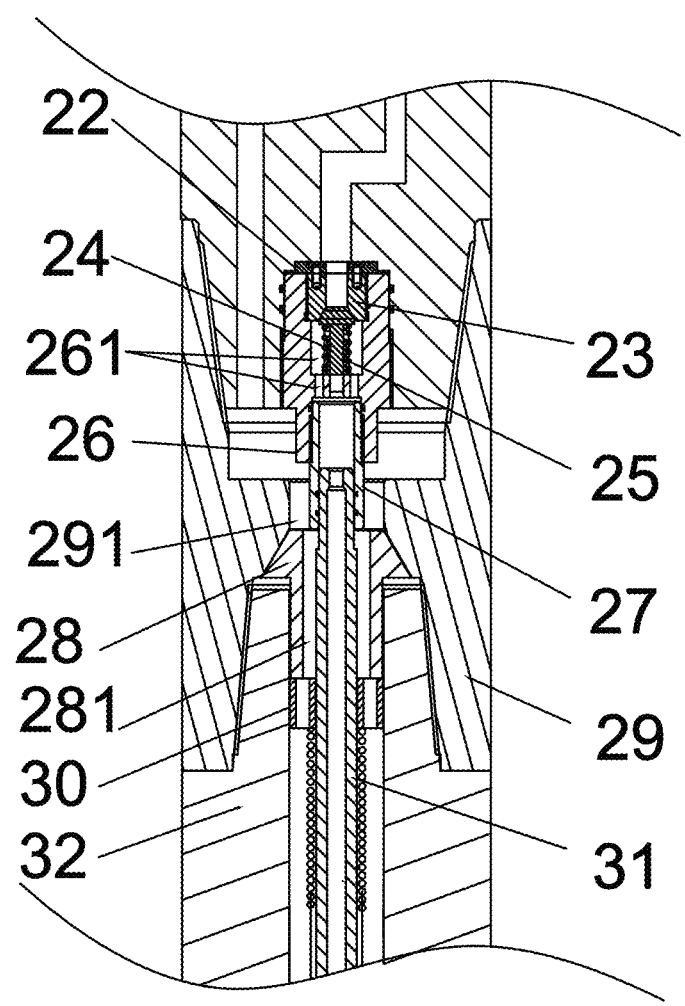
FIG. 6 is a schematic diagram of the structure of a high pressure valve in the present disclosure.

Preferably, as shown in FIG. 6, the high pressure valve includes a valve body 26 coaxially arranged at a lower end of the lower plunger cylinder 21, the valve body 26 is provided with a valve body channel 261 in communication with the conveying pipe 36.

An inner upper part of the valve body 26 is fixedly provided with a sealing head 23, and an inner lower part of the valve body 26 is slidably fitted with a conical valve core 24. A lower part of the conical valve core 24 is sleeved with a reset spring 25, and a lower end of the reset spring 25 is pressed against the support step on an inner side of the valve body 26.

A bottom of the sealing head 23 is a conical structure with a narrow top and a wide bottom, a bottom conical surface of the sealing head 23 and an upper conical surface of the conical valve core 24 form a conical sealing structure under an action of the reset spring 25.

An inner cavity of the sealing head 23 is in communication with the second flow channel 184 of the pressurizing chamber.

After the conical valve core 24 is moved downwards, the inner cavity of the sealing head 23 is in communication with the valve body channel 261.

Specifically, the top of the valve body 26 is provided with a valve cover 22, the inside of the valve cover 22 is provided with a through hole in communication with the second flow channel 184 of the pressurizing chamber.

The valve cover 22 is bolted to the sealing head 23.

The upper part of the outer wall of valve body 26 is threaded to the lower part of the inner wall of lower plunger cylinder 21, and the outer wall of sealing head 23 is threaded to the inner wall of valve body 26.

Preferably, as shown in FIG. 5, a limit sleeve 29 is arranged between the lower plunger cylinder 21 and the discharge flow pup joint 32. Specifically, threaded connections are made between the lower outer wall of the lower plunger cylinder 21 and the upper inner wall of the limit sleeve 29, as well as between the lower inner wall of the limit sleeve 29 and the upper outer wall of the discharge pup joint 32.

The middle part of the limit sleeve 29 is provided with a limit through hole 291 for the conveying pipe 36 to pass through.

A connecting sleeve 27 is arranged at an outlet of the high pressure valve, and the connecting sleeve 27 is connected to the conveying pipe 36.

An inner upper part of the discharge flow pup joint 32 is provided with a conveying pipe pup joint 28, the middle part of the conveying pipe pup joint 28 is provided with a pup joint through hole 281 for the conveying pipe 36 to pass through.

The first flow channel 183 of the pressurizing chamber, the limit through hole 291, the pup joint through hole 281, and the flow channel 321 are in communication with each other.

Specifically, the lower part of the inner wall of the valve body 26 is threaded connected to the outer wall of the connecting sleeve 27, the connecting sleeve 27 is threaded to the outer wall of the conveying pipe 36, and the outer wall of the conveying pipe pup joint 28 is threaded to the inner wall of the discharge pup joint 32.

The upper outer wall of the conveying pipe pup joint 28 has a conical surface structure with a thin top and a thick bottom. The inside of limit sleeve 29 is provide with a conical surface inner wall that forms a conical surface seal with the upper conical surface structure of the conveying pipe pup joint 28.

Preferably, an upper discharge flow sleeve 30 and a lower discharge flow sleeve 34 provided with circular structures are sequentially arranged in the flow channel 321 from top to bottom.

The inner walls of the upper discharge flow sleeve 30 and the lower discharge flow sleeve 34 are fixedly connected to the outer wall of the conveying pipe 36, and the outer walls of the upper discharge flow sleeve 30 and the lower discharge flow sleeve 34 are fixedly connected to the inner wall of the discharge flow pup joint 32.

The upper discharge flow sleeve 30 and the lower discharge flow sleeve 34 are provided with discharge passages in communication with the flow channel 321.

The conveying pipe 36 between the upper discharge flow sleeve 30 and the lower discharge flow sleeve 34 is provided with a damping spring 31.

Specifically, the top of the upper discharge flow sleeve 30 is fixedly connected to the bottom of the conveying pipe pup joint 28, the lower discharge flow sleeve 34 is fixedly arranged at the step on the inner wall of the discharge pup joint 32, and the upper part of the lower discharge piece sleeve 34 is provided with a spring limit sleeve 33.

Preferably, as shown in FIG. 5, a lower end of the conveying pipe 36 is connected to a high pressure pipe 361 through a high pressure pipe joint 35.

The high pressure pipe 361 is in communication with the inner chamber 37 of the drill bit.

Embodiment 2

On the basis of Embodiment 1, an upper joint 1 is fixedly arranged on an upper part of the electromagnetic valve upper seat 14, a battery assembly for supplying power to the electromagnetic valve 15 is fixedly arranged in an inner through hole of the upper joint 1.

Figure 2:
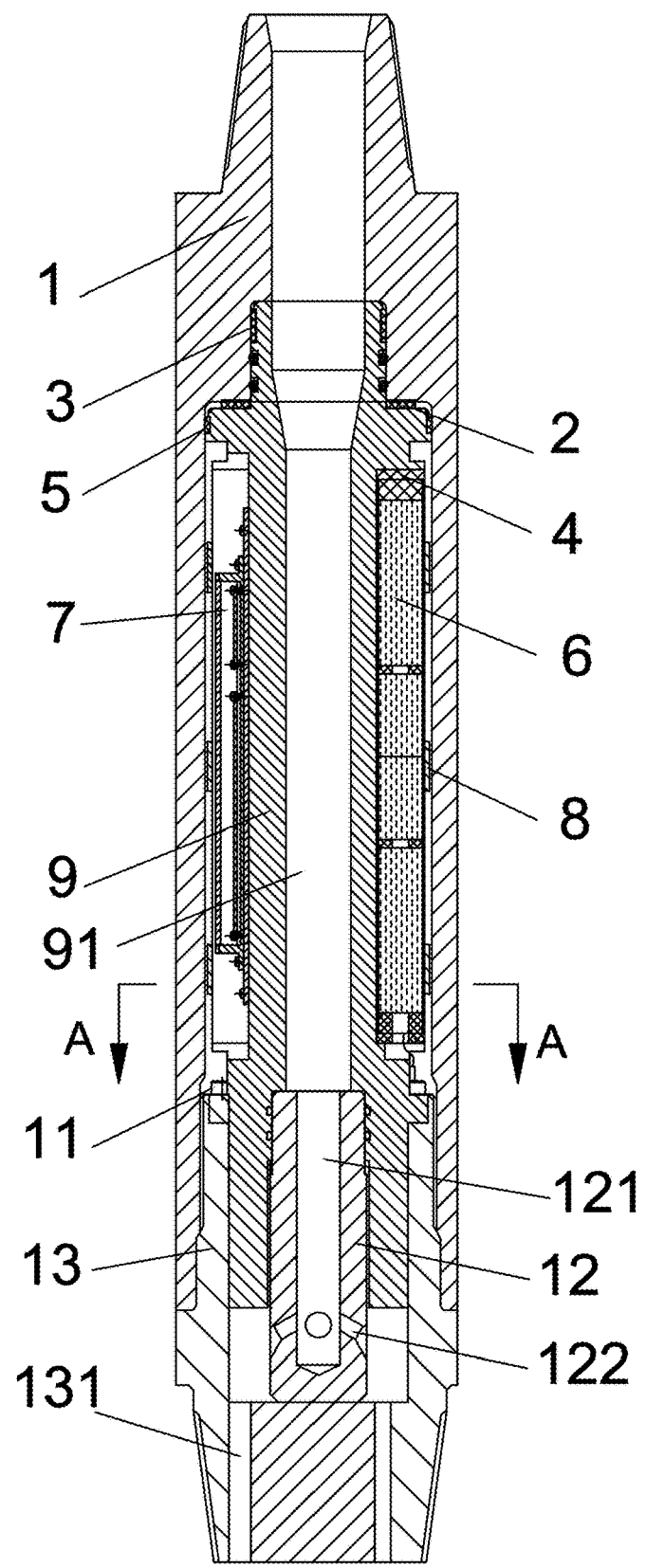
FIG. 2 is a schematic diagram of the structure of the battery assembly in the present disclosure.
Figure 3:
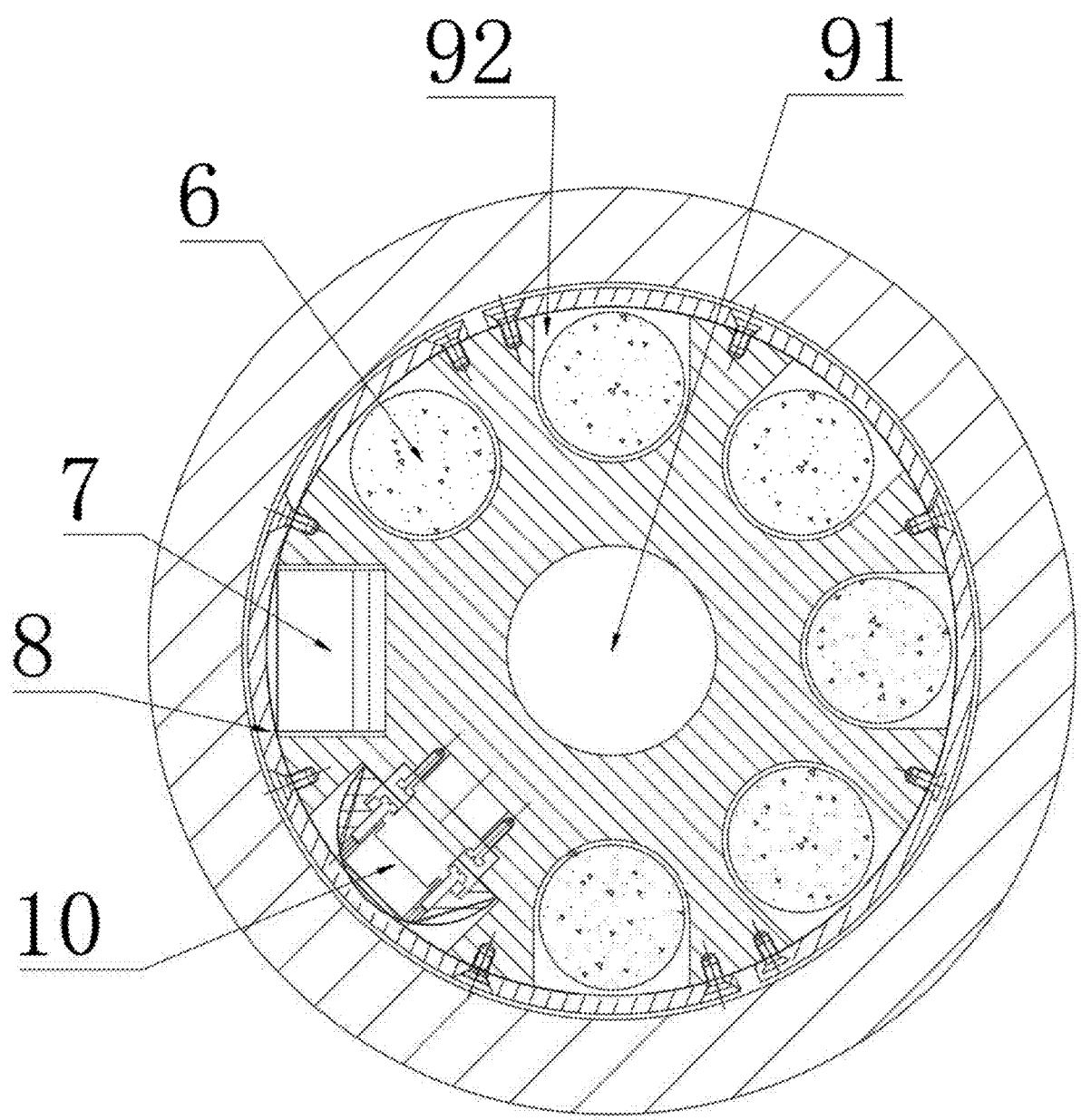
FIG. 3 is a sectional view of FIG. 2 taken along A-A section.

As shown in FIG. 2-FIG. 3, the battery assembly includes a plurality of batteries 6 and a battery pack bracket 9 fixed in the inner through hole of the upper joint 1.

An interior of the battery pack bracket 9 is provided with a bracket flow channel 91 that is in communication with the electromagnetic valve seat flow channel 151.

A plurality of assembled grooves 92 are uniformly arranged along the circumferential direction on the outer wall of the battery pack bracket 9, and the batteries 6 are assembled in the corresponding assembled grooves 92.

Specifically, one of the assembled grooves 92 is further provided with a controller 7 connected to the electromagnetic valve 15. The controller 7 controls the power on and off of the electromagnetic valve 15, that is, controls the switching frequency of the electromagnetic valve 15, and achieving the control of the direction changing frequency of the pressure intensifier.

The battery pack bracket 9 is further provided with a socket 10 connected to the battery 6 and a plug 11 electrically connected to the electromagnetic valve 15 and adapted to the socket 10.

One end of the assembled grooves 92 installed with battery 6 is provided with a battery protection baffle 4.

Specifically, a centralizer 5 is arranged between the outer wall of the battery pack bracket 9 and the inner wall of the upper joint 1, and the centralizer 5 is used to ensure that the central axis of the battery pack bracket 9 is collinear with the central axis of the upper joint 1.

Preferably, arc-shaped battery pressing plates 8 are provided on the outer wall of the battery pack bracket 9 to fix the batteries 6 in the assembled grooves 92.

The arc-shaped battery pressing plates 8 are connected to the battery pack bracket 9 through bolts.

Preferably, a sealing ring 3 is provided at the position where the battery pack bracket 9 is connected to the upper joint 1.

Specifically, the upper outer wall of the battery pack bracket 9 is threaded connected to the inner wall of the upper joint 1;

A gap washer 2 is provided at the step where the outer wall of the battery pack bracket 9 matches the inner wall of the upper joint 1.

Preferably, a diversion joint 13 is provided between the upper joint 1 and the electromagnetic valve upper seat 14.

A diversion head 12 is arranged at a bottom end of the battery pack bracket 9, an inner upper part of the diversion head 12 is provided with a main flow channel 121 in communication with the bracket flow channel 91, an inner lower part of the diversion head 12 is provided with a plurality of diversion channels 122 in communication with the main flow channel 121.

An inner bottom end of the diversion joint 13 is supported at a bottom end of the diversion head 12, a joint flow channel 131 in communication with the diversion channels 122 are provided on the diversion joint 13.

The joint flow channel 131 is in communication with the electromagnetic valve seat flow channel 151.

Specifically, the outer wall of the diversion head 12 is threaded to the lower part of the inner wall of the battery pack bracket 9, the upper part of the outer wall of the diversion joint 13 is threaded to the lower part of the inner wall of the upper joint 1, and the lower part of the outer wall of the diversion joint 13 is threaded to the upper part of the inner wall of the electromagnetic valve upper seat 14.

The operating process of the electromagnetic reversal downhole pressure intensifier in the disclosure can be divided into two stages: boosting stroke and resetting process, as follows:

Boosting Stroke:

During the drilling process, the upper joint 1 of the electromagnetic reversal downhole pressure intensifier is connected to the drill string, and the discharge flow pup joint 32 is connected to the drill bit 38, which is lowered to the bottom of the well together with the drill string;

The drilling fluid enters the electromagnetic valve seat flow channel 151 from the inner through hole of the upper joint 1, the bracket flow channel 91, the main flow channel 121, the diversion channel 122, and the joint flow channel 131;

After that, the drilling fluid is diverted, and a portion of the first part of the drilling fluid from electromagnetic valve seat flow channel 151 enters the pressurizing chamber inlet flow channel 152 via the channels of the port P and the port A which are in communication with each other by the electromagnetic valve 15, and then enters into the non-rod chamber 181;

The second part of the drilling fluid enters into the rod chamber 182 through the electromagnetic valve seat flow channel 151 and the one-way valve 19;

At this time, under the action of liquid pressure difference, the drilling fluid entering the non-rod chamber 181 pushes the plunger 18 downwards, compressing the drilling fluid in the rod chamber 182, thereby forming a high pressure fluid; The high-pressure fluid reaches the high-pressure valve through the second flow channel of the pressurizing chamber 184; Under the action of liquid pressure, the conical valve core 24 is pushed down by overcoming the action of the reset spring 25, causing high pressure fluid to pass through the valve body passage 261, the connecting sleeve 27, the conveying pipe 36, the high pressure pipe 361, and the inner chamber 37 of drill bit to reach the nozzle of drill bit 38. The high pressure fluid is sprayed onto the rock target surface at the bottom of the well through the nozzle, cutting the rock at the bottom of the well into grooves, unloading the local stress, and combined with mechanical impact to accelerate the speed of rock crushing at the bottom of the hard rock well;

The other portion of the first part of the drilling fluid from the electromagnetic valve seat flow channel 151 reaches the bit water way via the first flow channel of the pressurizing chamber 183, the limit through hole 291, the pup joint through hole 281, and the flow channel 321. This portion of the drilling fluid acts on the bottom of the well through the bit water way to clean the rock near the cutter teeth of the drill bit, so as to reduce repeated crushing, thereby reducing the wear of the drill bit, improving the rock breaking efficiency at the bottom of the well.

Resetting process: After the above pressure boosting process is completed, the plunger 18 is located at the bottom of the plunger stroke track in the lower plunger cylinder 21, at this time, the electromagnetic reversal downhole pressure intensifier needs to be reversed. During the reversing process, the controller 7 sends a signal and the valve core of the electromagnetic valve 15 is energized to move, so that channels of the port A and the port T are in in communication with each other.

The drilling fluid enters the electromagnetic valve seat flow channel 151 from the inner through hole of the upper joint 1, the bracket flow channel 91, the main flow channel 121, the diversion channel 122, and the joint flow channel 131. At this point, the port A and the port T of the electromagnetic valve 15 is no longer communicated, so drilling fluid no longer enters the interior of the electromagnetic valve 15.

After that, the drilling fluid is diverted, and a portion of the drilling fluid reaches bit water way from the electromagnetic valve seat flow channel 151 via the first flow channel 183 of the pressurizing chamber, the limit through hole 291, the pup joint through hole 281, and the flow channel 321, which acts on the rock target surface at the bottom of the well and performs rock cleaning on the drill bit.

The other portion of the drilling fluid from the electromagnetic valve seat flow channel 151 via the one-way valve 19 into the rod chamber 182, at this time, the liquid in the rod chamber 182 cannot open the high pressure valve, instead, under the action of the liquid pressure difference, the plunger 18 is pushed upward, causing the fluid in the non-rod chamber 181 to flow into the annular space between the drill pipe and the casing pipe along the pressurizing chamber inlet flow channel 152 through the channels of the port A and the port T which are in communication with each other by the electromagnetic valve 15, until the plunger 18 is reset to the uppermost end of the plunger stroke track.

Figure 7:
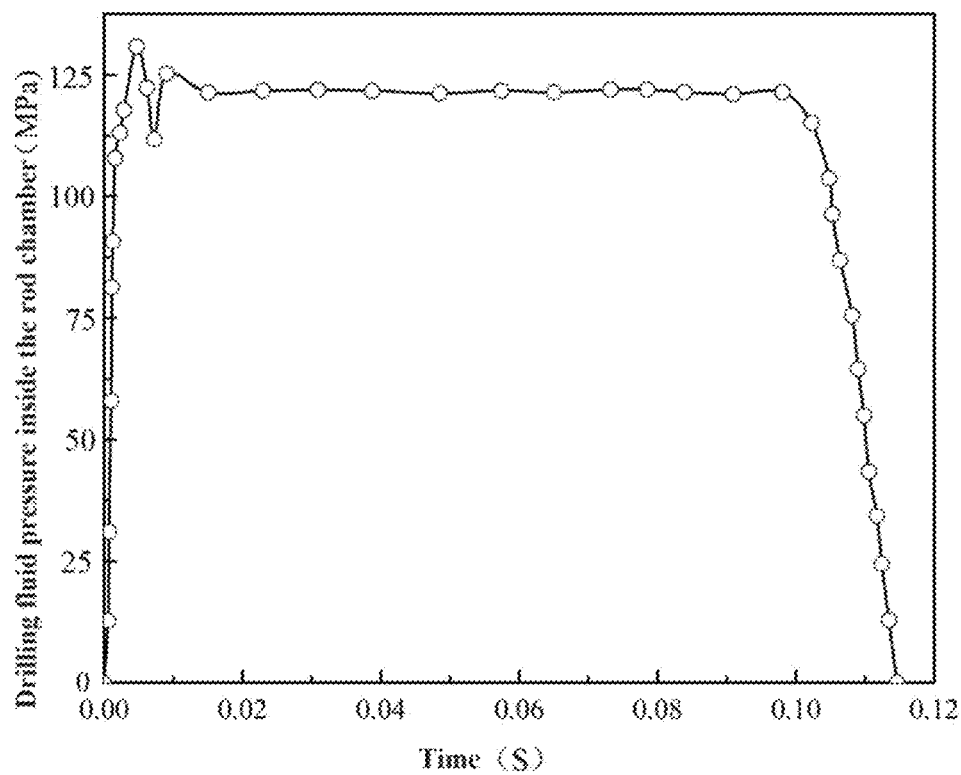
FIG. 7 is a characteristic diagram of the pressure output of drilling fluid in the rod chamber of the electromagnetic reversal downhole pressure intensifier of the present disclosure during the boosting process.
Figure 8:
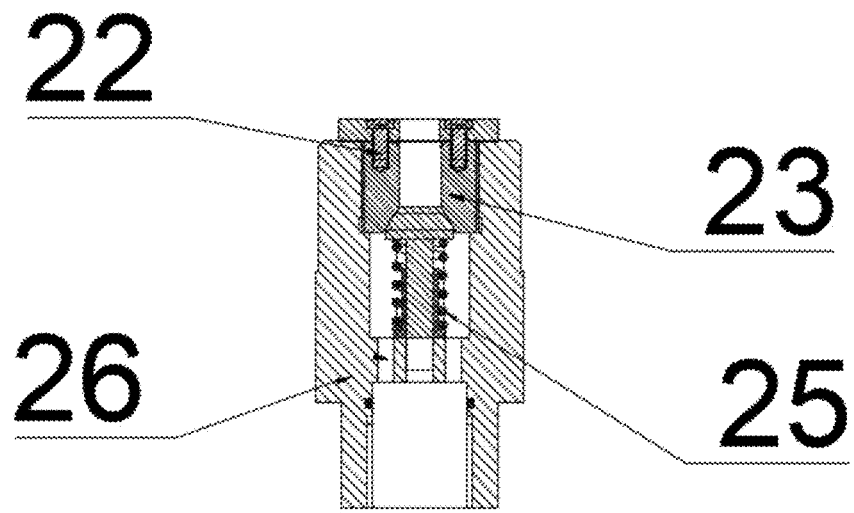
FIG. 8 is a schematic diagram showing the structure of the high pressure valve alone.
Figure 9:
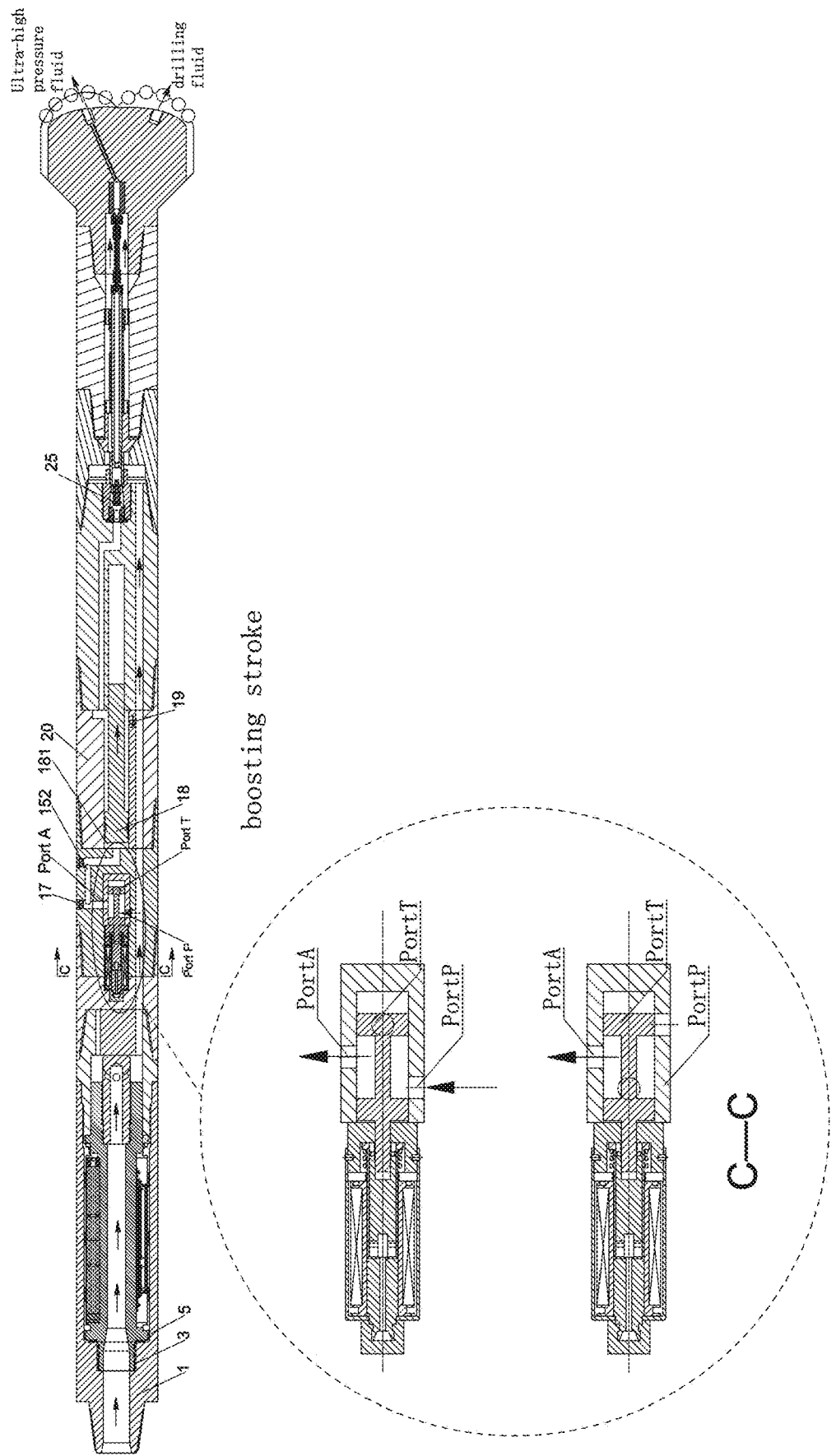
FIG. 9 is a schematic diagram showing the structure of the electromagnetic reversal downhole pressure intensifier of the present disclosure during the boosting stroke.
Figure 10:
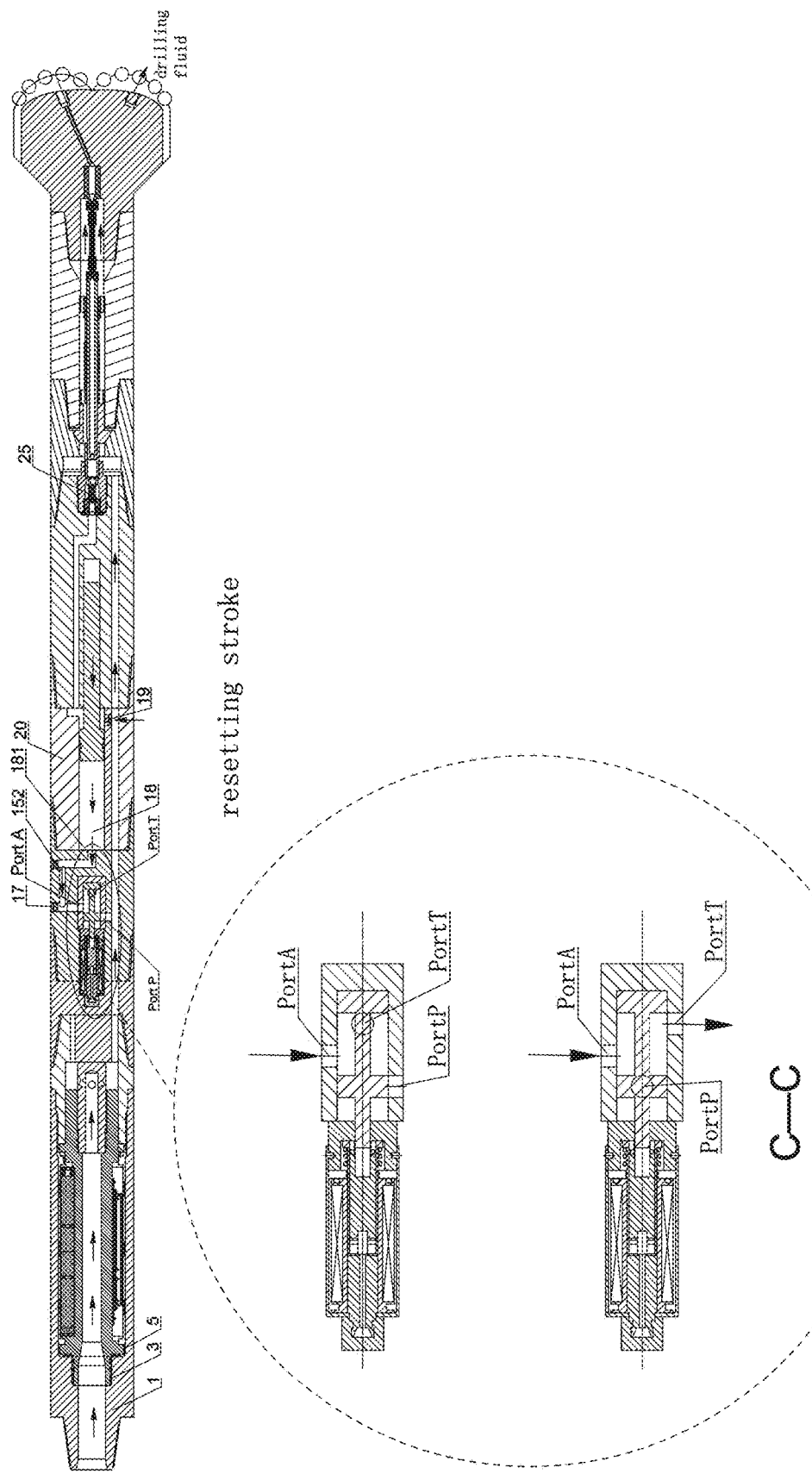
FIG. 10 is a schematic diagram showing the structure of the electromagnetic reversal downhole pressure intensifier of the present disclosure during the resetting stroke.

Wherein, the pressure output characteristics of the drilling fluid in the rod chamber 182 of the electromagnetic reversal downhole pressure intensifier in the boosting stroke of the present disclosure are shown in FIG. 7:

The plunger 18 is accelerated under the action of liquid pressure difference force. During the acceleration process, the drilling fluid in the rod chamber 182 is compressed, and the drilling fluid pressure in the rod chamber 182 rapidly increases to the peak pressure. At the same time, the pressure of the nozzle jet rapidly increases to the peak pressure of the jet. Subsequently, the pressure at both ends of the plunger 18 reaches equilibrium, and the plunger 18 moves at a constant speed. During this process, the drilling fluid pressure in the rod chamber 182 is maintained at the peak pressure, and the pressure of the nozzle jet is also maintained at the peak pressure of the jet. When the plunger 18 reaches the limit position of plunger stroke, it stops moving and the pressure boosting process ends. At this time, the pressure inside the rod chamber 182 drops sharply, and the pressure of the nozzle jet also drops sharply. During the pressure intensifier stroke, the drilling fluid pressure inside the rod chamber 182 and the pressure of the nozzle jet both exhibit square wave characteristics. When the reversal enters the resetting process, the pressure of the nozzle jet drops to 0. In the disclosure, the amplitude and frequency of the drilling fluid pressure and the nozzle jet pressure waveform inside the rod chamber 182 are related to the reversal frequency of the pressure intensifier. Therefore, the pressure output characteristics of the electromagnetic reversal downhole pressure intensifier of the present disclosure can be controlled by the controller to switch the frequency of the electromagnetic valve, thereby achieving modulation of the output characteristic waveform.

In the disclosure, the nozzle jet impacts the rock target surface at the bottom of the well, causing local damage to the rock. The nozzle is eccentrically installed on the drill bit, and during the rotary drilling process, the nozzle will rotate around the axis of the drill bit to achieve continuous rock damage, ultimately cutting out grooves at the bottom of the well.

In the actual drilling process, the range where the pressure of the nozzle jet is higher than a certain value is the effective range of the rock cutting grooves at the bottom of the well. However, compared with the jet pressure of the sine wave characteristic in the existing shock absorption pressure intensifier or the jet pressure of the existing screw pressure intensifier, the effective range of the rock cutting grooves at the bottom of the well is increased. At the same time, the output frequency of the drilling fluid pressure and the nozzle jet pressure inside the rod chamber 182 can be adjusted by adjusting the direction reverse frequency of the boosting device according to the formation characteristics, matching the rotation frequency of the drill bit can achieve control of the cutting characteristics, making it easier to achieve bottom hole rock cutting.

The present disclosure is directly driven by drilling fluid energy during operation, and uses the liquid pressure difference force on both sides of the upper end of the plunger to pressurize. The pressure boosting process does not consume hydraulic energy, and the bottom hole drilling fluid jet is used to achieve bottom hole groove cutting and rock breaking. The overall device of the present disclosure has a simple structure and easy to implement functions. When the electromagnetic reversal downhole pressure intensifier wears out or reaches its service life, it does not need to be pulled out and can continue to work as a drill string without affecting the circulation of the overall drilling fluid.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. An electromagnetic reversal downhole pressure intensifier, comprising a pressure intensifier and a drill bit, a nozzle and a bit water way are arranged on the drill bit, and the nozzle is in communication with an inner chamber of the drill bit, wherein the pressure intensifier comprises an electromagnetic valve seat, a pressurizing chamber, and a discharge flow pup joint fixedly connected in sequence along an axial direction;

an electromagnetic valve is arranged in the electromagnetic valve seat, and the electromagnetic valve is a two-position three-way electromagnetic valve; the electromagnetic valve seat is provided with a through electromagnetic valve seat flow channel, the electromagnetic valve seat flow channel is connected to a port P of the electromagnetic valve, a port A of the electromagnetic valve is connected to a pressurizing chamber inlet flow channel arranged in the electromagnetic valve seat, a port T of the electromagnetic valve is in communication with an annular space between a drill rod and a casing pipe;

a plunger is coaxially arranged in the pressurizing chamber, an upper end of the plunger is in sealed slide fitting with an inner wall of the pressurizing chamber, the plunger is in sealed slide fitting with a lower end of the pressurizing chamber; the upper end of the plunger separates the inner chamber of the pressurizing chamber into a non-rod chamber and a rod chamber; a first flow channel of the pressurizing chamber and a second flow channel of the pressurizing chamber are arranged on a cylinder wall of the pressurizing chamber; a one-way valve is arranged between the first flow channel of the pressurizing chamber and the rod chamber, a flow direction of the one-way valve is from the first flow channel of the pressurizing chamber to the rod chamber; the rod chamber is in communication with the second flow channel of the pressurizing chamber;

a conveying pipe is arranged inside the discharge flow pup joint, a flow channel is formed between an outer wall of the conveying pipe and an inner wall of the discharge flow pup joint;

the drill bit is connected to the discharge flow pup joint;

the electromagnetic valve seat flow channel, the first flow channel of the pressurizing chamber, the flow channel, and the bit water way are sequentially in communication with each other; the pressurizing chamber inlet flow channel is in communication with the non-rod chamber, the second flow channel of the pressurizing chamber, the conveying pipe, and the inner chamber of the drill bit are sequentially connected to each other; a high pressure valve is arranged between the second flow channel of the pressurizing chamber and the conveying pipe;

the electromagnetic valve seat comprises an electromagnetic valve upper seat and an electromagnetic valve lower seat which are fixedly connected;

the electromagnetic valve seat flow channel passes through the electromagnetic valve upper seat and the electromagnetic valve lower seat;

the pressurizing chamber comprises an upper plunger cylinder and a lower plunger cylinder which are fixedly connected, and the upper plunger cylinder is fixedly connected to the electromagnetic valve lower seat;

the first flow channel of the pressurizing chamber passes through the upper plunger cylinder and the lower plunger cylinder;

the upper end of the plunger is in sealed slide fitting with an inner wall surface of the upper plunger cylinder, the plunger is in sealed slide fitting with an inner wall surface of the lower plunger cylinder;

the second flow channel of the pressurizing chamber is arranged on the lower plunger cylinder;

the pressure valve comprises a valve body coaxially arranged at a lower end of the lower plunger cylinder, the valve body is provided with a valve body channel in communication with the conveying pipe;

an inner upper part of the valve body is fixedly provided with a sealing head, an inner lower part of the valve body is slidably fitted with a conical valve core; a lower part of the conical valve core is sleeved with a reset spring, and a lower end of the reset spring is pressed against support step on an inner side of the valve body;

a bottom of the sealing head is a conical structure with a narrow top and a wide bottom, a bottom conical surface of the sealing head and an upper conical surface of the conical valve core form a conical sealing structure under an action of the reset spring;

an inner cavity of the sealing head is in communication with the second flow channel of the pressurizing chamber; and after the conical valve core is moved downwards, the inner cavity of the sealing head is in communication with the valve body channel.

2. The electromagnetic reversal downhole pressure intensifier as claimed in claim 1, wherein a limit sleeve is arranged between the lower plunger cylinder and the discharge flow pup joint;

a middle part of the limit sleeve is provided with a limit through hole for the conveying pipe to pass through;

a connecting sleeve is arranged at an outlet of the pressure valve, and the connecting sleeve is connected to the conveying pipe;

an inner upper part of the discharge flow pup joint is provided with a conveying pipe pup joint, a middle part of the conveying pipe pup joint is provided with a pup joint through hole for the conveying pipe to pass through; and the first flow channel of the pressurizing chamber, the limit through hole, the pup joint through hole, and the flow channel are in communication with each other.

3. The electromagnetic reversal downhole boost device as claimed in claim 1, wherein an upper discharge flow sleeve and a lower discharge flow sleeve provided with circular structures are sequentially arranged in the flow channel from top to bottom;

an inner wall of the upper discharge flow sleeve and an inner wall of the lower discharge flow sleeve are fixedly connected to the outer wall of the conveying pipe, an outer wall of the upper discharge flow sleeve and an outer wall of the lower discharge flow sleeve are fixedly connected to the inner wall of the discharge flow pup joint;

the upper discharge flow sleeve and the lower discharge flow sleeve are provided with discharge passages in communication with the flow channel; and the conveying pipe between the upper discharge flow sleeve and the lower discharge flow sleeve is provided with a damping spring.

4. The electromagnetic reversal downhole pressure intensifier as claimed in claim 1, wherein a lower end of the conveying pipe is connected to a high pressure pipe through a pressure pipe joint; and the pressure pipe is in communication with the inner chamber of drill bit.

5. The electromagnetic reversal downhole pressure intensifier as claimed in claim 1, wherein an upper joint is fixedly arranged on an upper part of the electromagnetic valve upper seat, a battery assembly for supplying power to the electromagnetic valve is fixedly arranged in an inner through hole of the upper joint;

the battery assembly comprises a plurality of batteries and a battery pack bracket fixed in the inner through hole of the upper joint;

an interior of the battery pack bracket is provided with a bracket flow channel that is in communication with the electromagnetic valve seat flow channel; and a plurality of assembled grooves are uniformly arranged along a circumferential direction on an outer wall of the battery pack bracket, and the batteries are assembled in the corresponding assembled grooves.

6. The electromagnetic reversal downhole pressure intensifier as claimed in claim 5, wherein arc-shaped battery pressing plates are provided on the outer wall of the battery pack bracket to fix the batteries in the assembled grooves; and the arc-shaped battery pressing plates are connected to the battery pack bracket through bolts.

7. The electromagnetic reversal downhole pressure intensifier as claimed in claim 6, wherein a diversion joint is provided between the upper joint and the electromagnetic valve upper seat;

a diversion head is arranged at a bottom end of the battery packbracket, an inner upper part of the diversion head is provided with a main flow channel in communication with the bracket flow channel, an inner lower part of the diversion head is provided with a plurality of diversion channels in communication with the main flow channel;

an inner bottom end of the diversion joint is supported at a bottom end of the diversion head, a joint flow channel in communication with the diversion channels are provided on the diversion joint; and the joint flow channel is in communication with the electromagnetic valve seat flow channel.

\* \* \* \* \*